UNITED STATES PATENT OFFICE.

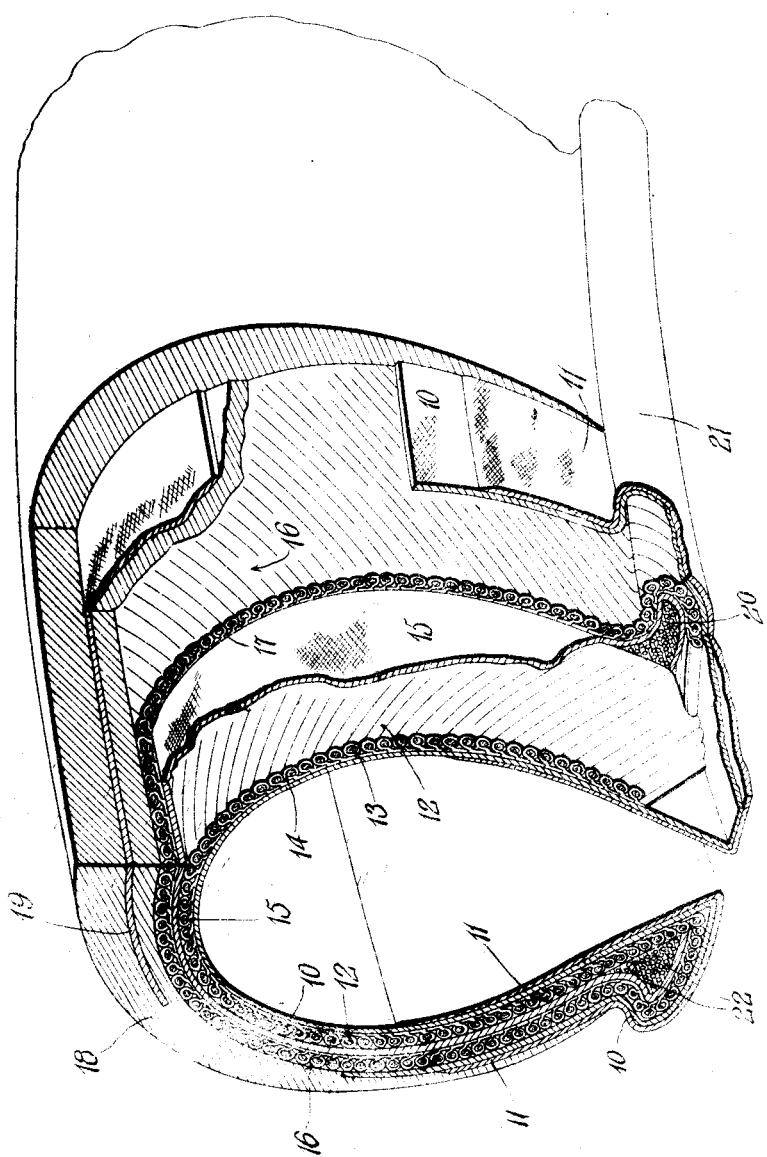

ROBERT M. MERRIMAN, OF AKRON, OHIO.

AUTOMOBILE-TIRE.

1,192,090.     Specification of Letters Patent.     Patented July 25, 1916.

Application filed April 6, 1916. Serial No. 89,430.

*To all whom it may concern:*

Be it known that I, ROBERT M. MERRIMAN, a citizen of the United States, residing at Akron, in the county of Summit and State of Ohio, have invented certain new and useful Improvements in Automobile-Tires, of which the following is a specification.

My invention relates to new and useful improvements in the casings of pneumatic tires and more particularly to that type commonly known as cord tires, the primary object of my invention being the provision of an improved and superior form of two ply cord tire.

A still further object of my invention consists in the provision of a tire having an inner ply of cord looped across the tread portion of the tire at an angle of substantially forty-five degrees in one direction and an outer ply of cord correspondingly looped across the tread portion of the tire at an angle of substantially forty-five degrees in the opposite direction, the terminals of all of the cord loops of both plies extending downwardly in such a manner that the two plies together encircle the stiffening cores of the beads of the tire.

In this connection, a still further object of my invention consists in providing each strand of cord with a casing or covering of fabric, a portion of which snugly incloses the cord and the remainder of which extends laterally to form a seat for the next adjacent loop of cord. By this arrangement, when the cords are properly looped about the core in the formation of the tire, and they and the tread portion of the tire properly vulcanized, all likelihood of one loop or strand of the cord separating from an adjacent loop or strand is avoided. As this is one of the chief reasons for blow outs and punctures of cord tires, it will be seen that this is a very important feature.

A still further object of my invention consists in providing a two ply fabric reinforcement for the bead portion of the tire to insure suitable anchoring of the ends of the strands of cord about the beads.

With these and other objects in view, my invention will be more fully described, illustrated in the accompanying drawing, and then specifically pointed out in the claims which are attached to and form a part of this application.

The drawing illustrates, in section, a cord tire constructed in accordance with my invention, the several layers constituting the tire being broken away at various points to more fully show the manner in which the tire is made.

In manufacturing a tire in accordance with my invention, an inner ply of fabric 10 is positioned about the metal form or core upon which the tire is to be built in the usual manner, the sides of this fabric strip being of such length that after the tire has been partially constructed the edges or side portions of the strip may be folded outwardly and upwardly to constitute outer reinforcing portions surrounding the beads and side walls of the tire. As the side walls of tires are subject to severe strain, if the tubes of the tires are not sufficiently inflated, I preferably provide side reinforcing strips 11 which are cemented or otherwise secured to the inner face of the inner ply of fabric 10 in such a manner that their upper edges extend substantially to the tread portion of the tire, as shown, while their lower edges project sufficiently to be folded outwardly and upwardly about the bead and against the outer face of the ply 10 when the latter is folded upwardly to the position shown in the drawing.

About the tire lining thus formed upon the core, I loop an inner ply 12 of cord in such a manner that the various strands 13 of the cord extend transversely of the tire and at substantially an angle of forty-five degrees to the bead portion thereof, the ends of the loops extending to a point slightly below what will be the base of the bead when the tire is constructed. Each strand or portion of cord 13 employed is inclosed in a fabric covering 14, the arrangement of which is clearly shown in the drawing, this covering being in the form of a strip continuous with the cord and having one side portion snugly encircling the cord to form a tubular sleeve for it and the opposite side portion extending substantially tangential to the cord and resting flatly upon the fabric ply 10 of the tire. In this manner, each strand of cord, together with its fabric sleeve, rests upon the free edge portion of the sleeve of an adjacent strand of cord, for which reason it will be clear that when the various plies making up the tire are properly impregnated with rubber and other binding materials and vulcanized, all strands of cord will be strongly reinforced and held against separation one from the other. Surrounding this inner ply of cord 12, is a parting ply 15 of fabric or other suitable material, the edges of which project below the bead and over this parting ply 15 I form a second ply of cord 16 corresponding to the inner ply 12 with the exception that the strands extend in the opposite direction to the strands of the ply 12. The various strands of this outer ply are inclosed in fabric coverings 17 and the ends of such strands project beyond what would be the base portion of the bead when the tire is formed.

A tread portion 18 of rubber or other composition is then positioned about the inner portion of the tire thus formed and incorporated in this tread portion is the usual breaker strip 19 which extends circumferentially of the tire projecting at its sides slightly beyond the tread portion thereof. This breaker strip is preferably formed of fabric cut in such a manner that the threads extend diagonally of the strip in order to insure suitable yielding during distortion of the tire when in use.

After the main body of the tire has thus been constructed, the body portions 20 of the beads 21 are applied. Each of these body portions is formed in the usual manner, each comprising a plurality of rings or strands 22 of relatively stiff, strong wire, such as piano wire, embedded in rubber and molded to the proper shape, dependent upon the type of tire being made. Each ring or strand of wire is preferably made of a plurality of fine strands woven or twisted together. These beads are positioned to lie between the outer face of the inner cord ply 12 and the inner face of the parting fabric ply 15 and the ends of the loops or strands 13 of the inner cord ply 12 are cut off diagonally in the manner shown slightly below the body proper 20 of the beads. The fabric parting ply 15 and outer cord ply are then folded inwardly against the lower faces of the beads proper 20 and any surplus edge portions of the fabric 15 and ends of the loops or strands of the cord ply 16 are cut away in such a manner that the body portions proper of the beads are completely inclosed in the inner and outer cord plies, this being clearly shown in the drawing. The beads are then completed by folding the free edges of the plies 10 and 11 outwardly and against the outer face of the outer cord ply 16. Preferably all embedded edges of various fabric plies making up the tire are skived, as shown, in order that the resultant tire may present as smooth and neat appearance as possible. The tire thus constructed is then vulcanized and cured in the usual manner. Obviously, this method of tire manufacture may be employed in making tires of the clencher and straight side types with equal success.

By constructing a tire in accordance with my invention, the body portions of the beads are firmly anchored in place, being surrounded as they are upon all sides by the strands of cord making up the inner and outer cord plies of the tire, these strands in turn being firmly anchored in place by a double thickness of fabric passing about the boss and having their edges anchored to the inner and outer sides of the tire itself. By inclosing each strand of cord in its separate sleeve having a flap or wing to seat the next adjacent strand of cord, I insure against any possibility of separation of one strand from another which would permit blow cuts and render punctures more likely.

It will, of course, be understood that I reserve the right to make any changes within the scope of the appended claims, such as may be found desirable when manufacturing the tire, without in the slightest degree departing from the spirit of my invention.

Having thus described the invention, what is claimed as new is:

1. A casing for pneumatic tires including an inner ply of fabric, an inner ply of strands of cord extending transversely across the tread and at an angle, an outer ply of strands of cord extending transversely across the tire and at substantially right angles to the first, and bead forming rings inserted between the inner cord ply and outer cord ply, the inner cord ply bearing against the inner faces of the bead forming rings, the outer cord ply bearing against the outer and lower faces of the rings and the inner fabric ply being folded outwardly about the bead and extended upwardly over the sides of the tire.

2. A casing for pneumatic tires including an inner ply of fabric, an inner ply of strands of cord extending transversely across the tread and at an angle, a parting ply of fabric over the cord ply, an outer ply of strands of cord extending transversely across the tire and at substantially right angles to the first, bead forming rings inserted between the inner cord ply and parting ply, the inner cord ply bearing against the inner faces of the bead forming rings, the parting ply and outer cord ply bearing against the outer and lower faces of the rings and the inner fabric ply being folded outwardly about the bead and extended upwardly over the sides of the tire, and reinforcing plies of fabric engaging at one edge along the inner faces of the side portions of the tire and folded about the beads and engaging at their other edges against the outer faces of the outwardly folded portions of the inner fabric ply.

3. In a cord tire casing, a ply embedded in the casing and made up of substantially parallel strands of cord extending transversely of the tire and engaging one against another, and a fabric sleeve inclosing each strand of cord.

4. In a cord tire casing, a ply embedded in the casing and made up of substantially parallel strands of cord extending transversely of the tire and engaging one against another, and a fabric sleeve inclosing each strand of cord, each sleeve having a laterally directed flap forming a seat for the next adjacent sleeve inclosed strand of cord.

5. In a pneumatic tire casing, inner and outer plies of cord, and a parting ply of fabric disposed between the plies of cord, each ply of cord including a plurality of substantially parallel strands extending transversely and diagonally of the tire, the strands of one ply extending at an angle substantially opposite to the strands of the other and each strand of each ply being inclosed in a fabric sleeve.

6. In a pneumatic tire casing, inner and outer plies of cord, and a parting ply of fabric disposed between the plies of cord, each ply of cord including a plurality of substantially parallel strands extending transversely and diagonally of the tire, the strands of one ply extending at an angle substantially opposite to the strands of the other and each strand of each ply being inclosed in a fabric sleeve, each sleeve having a lateral flap forming a seat for the next adjacent sleeve inclosed strand of cord.

In testimony whereof I affix my signature.

ROBERT M. MERRIMAN. [L. S.]